(12) United States Patent
Mestanov et al.

(10) Patent No.: US 10,575,316 B2
(45) Date of Patent: Feb. 25, 2020

(54) PRIORITIZING RADIO RESOURCES BETWEEN OVERLAPPING WIRELESS ACCESS POINT NODES

(71) Applicant: Telefonaktiebolaget LM Ericsson (publ), Stockholm (SE)

(72) Inventors: Filip Mestanov, Sollentuna (SE); Johan Söder, Stockholm (SE); Yu Wang, Solna (SE); Leif Wilhelmsson, Dalby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 15/529,882

(22) PCT Filed: Dec. 16, 2014

(86) PCT No.: PCT/SE2014/051510
§ 371 (c)(1),
(2) Date: May 25, 2017

(87) PCT Pub. No.: WO2016/099349
PCT Pub. Date: Jun. 23, 2016

(65) Prior Publication Data
US 2017/0332384 A1 Nov. 16, 2017

(51) Int. Cl.
*H04W 72/00* (2009.01)
*H04W 72/10* (2009.01)
(Continued)

(52) U.S. Cl.
CPC ......... *H04W 72/10* (2013.01); *H04L 41/0816* (2013.01); *H04W 28/0268* (2013.01);
(Continued)

(58) Field of Classification Search
CPC ............. H04W 72/10; H04W 28/0268; H04W 74/0816; H04W 88/08; H04W 28/16;
(Continued)

(56) References Cited

U.S. PATENT DOCUMENTS

2003/0012167 A1   1/2003   Benveniste
2009/0213776 A1   8/2009   Chu et al.
(Continued)

FOREIGN PATENT DOCUMENTS

WO   WO 03 039054   5/2003
WO   WO 2007 051140   5/2007

OTHER PUBLICATIONS

Supplementary European Search Report for Application No./Patent No. 14908525.0-1857 / 3235326—dated Nov. 13, 2017.
(Continued)

*Primary Examiner* — Pakee Fang
(74) *Attorney, Agent, or Firm* — Baker Botts, LLP

(57) ABSTRACT

A first wireless Access Point (AP) node 102 and a method therein for controlling radio resource usage. The first wireless AP node is arranged to have a first Radio Frequency (RF) coverage area 102a that is at least partly overlapping with a second RF coverage area 104a of a second wireless AP node 104. The first and second wireless AP nodes are arranged to operate on the same RF channel. The method comprises configuring a first priority level of the first wireless AP node in relation to a second priority level of the second wireless AP node, which first and second priority levels are priority levels for accessing the RF channel. The method further comprises transmitting, to a wireless device 108 associated with the first wireless AP node, data via the RF channel in dependence of the first priority level. Thereby, the radio resource usage is controlled. According to some embodiments, the priority level is set based on negotiations
(Continued)

between the first and second wireless AP nodes. According to other embodiments, the priority level is set based on communication between the first wireless AP node and a management node 110.

14 Claims, 5 Drawing Sheets

(51) Int. Cl.
*H04W 74/08* (2009.01)
*H04L 12/24* (2006.01)
*H04W 28/02* (2009.01)
*H04W 88/08* (2009.01)
*H04W 74/00* (2009.01)
*H04L 12/927* (2013.01)
*H04W 28/16* (2009.01)

(52) U.S. Cl.
CPC ....... *H04W 74/0816* (2013.01); *H04W 88/08* (2013.01); *H04L 41/5003* (2013.01); *H04L 47/805* (2013.01); *H04W 28/16* (2013.01); *H04W 74/002* (2013.01)

(58) Field of Classification Search
CPC .............. H04W 74/002; H04L 41/0816; H04L 41/5003; H04L 47/805
See application file for complete search history.

(56) References Cited

U.S. PATENT DOCUMENTS

2009/0279427 A1    11/2009  Ji et al.
2016/0192379 A1*   6/2016  Behravan .............. H04W 72/04
                                                                370/329

OTHER PUBLICATIONS

OBSS HCCA Race Condition by Alex Ashley, NDS Ltd; doc.: IEEE 802.11-10/0062r1—Mar. 15, 2010.
International Search Report for International application No. PCT/SE2014/051510—dated Oct. 8, 2015.
Novelty Search Report; Swedish Patent and Registration Office; dated Sep. 24, 2014.
Channel Access Throttling for Overlapping Bss Management by Bo Han et al.; IEEE International Conference on Communications; Session WN-P3: Topics in Wireless Networks I—2009.
Coordination Between Access Points in Distributed Flexible Spectrum Use by Elena Virtej et al.; IEEE 20th International Symposium on Personal, Indoor and Mobile Radio Communications (PIMRC 2009);—IEEE 2009.

* cited by examiner

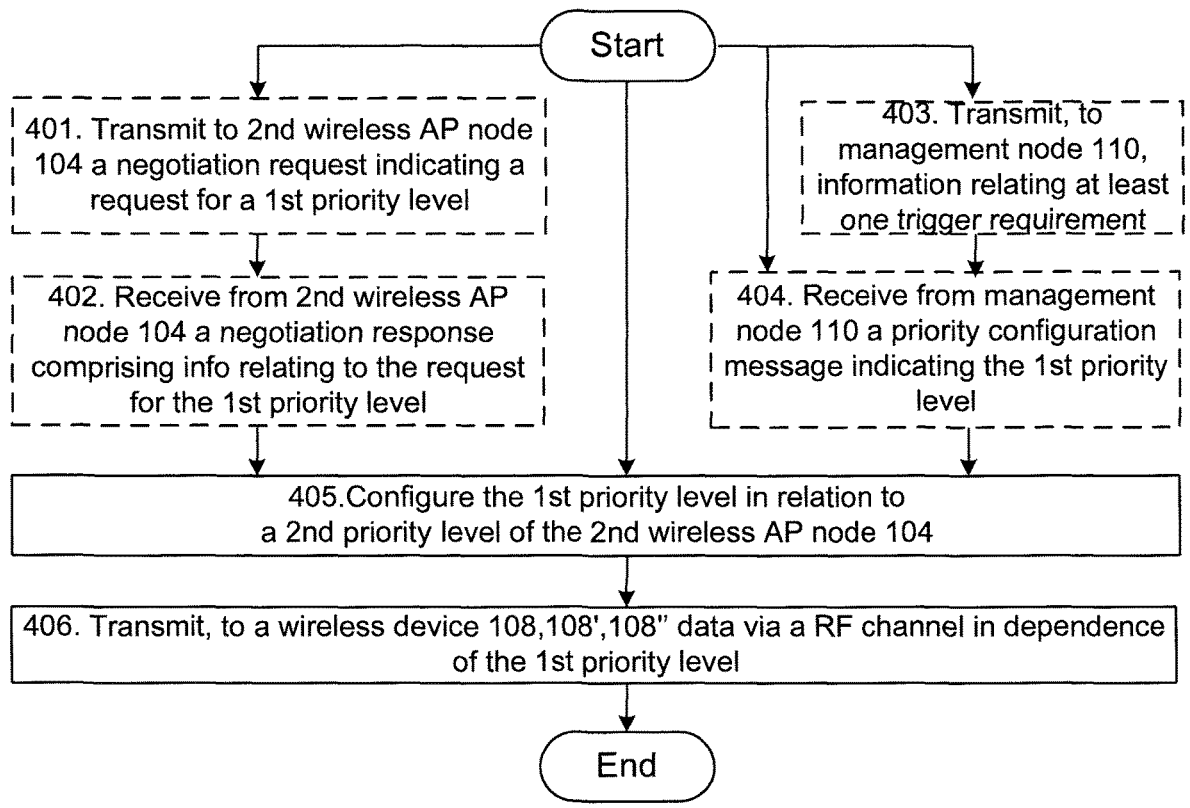
Fig. 4 Method in a first wireless AP node 102
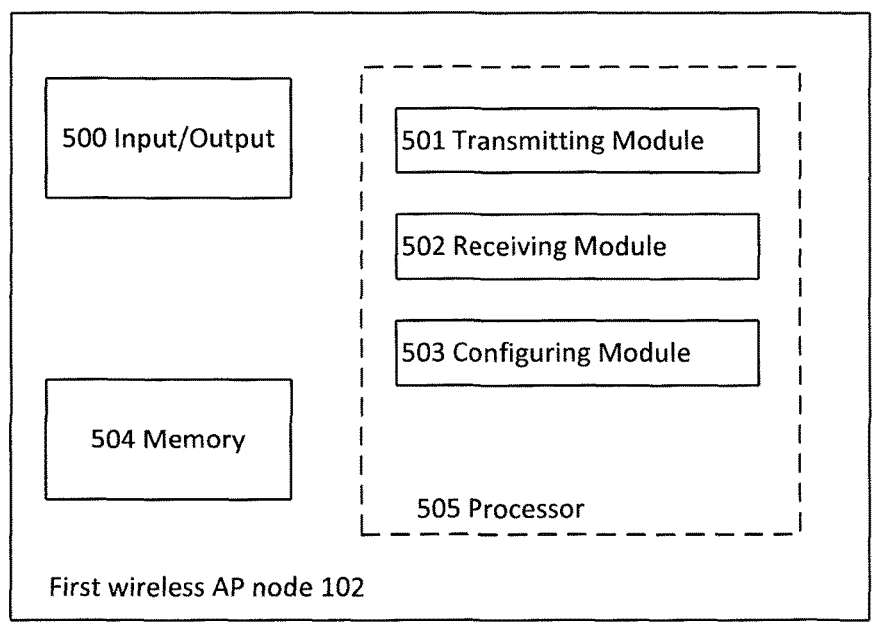
Fig. 5

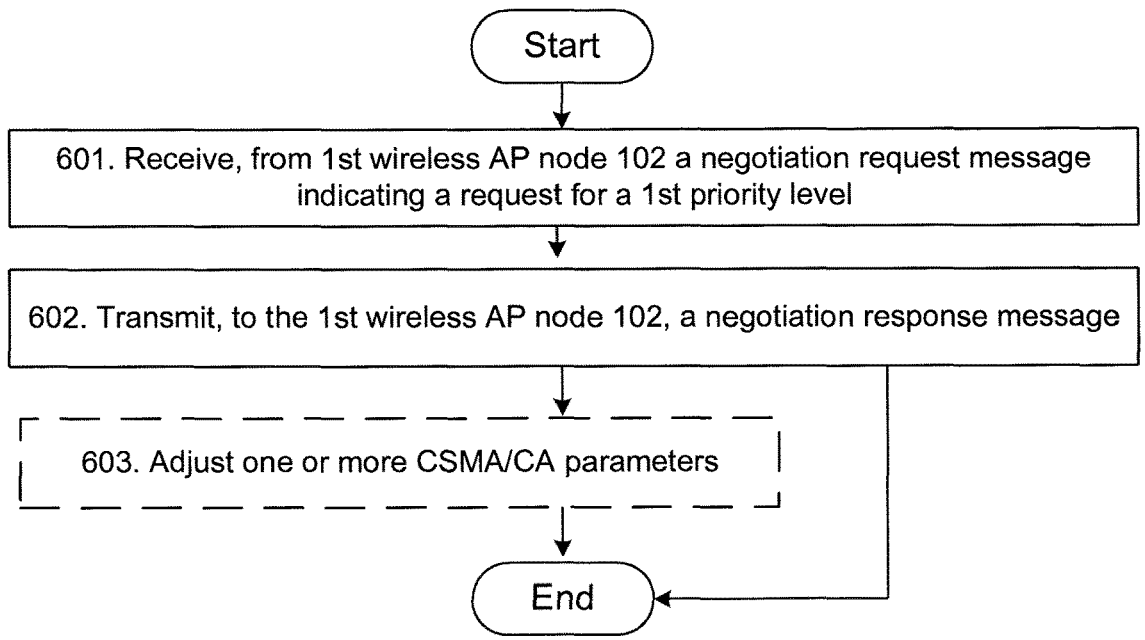
Fig. 6 Method in a second wireless AP node 104
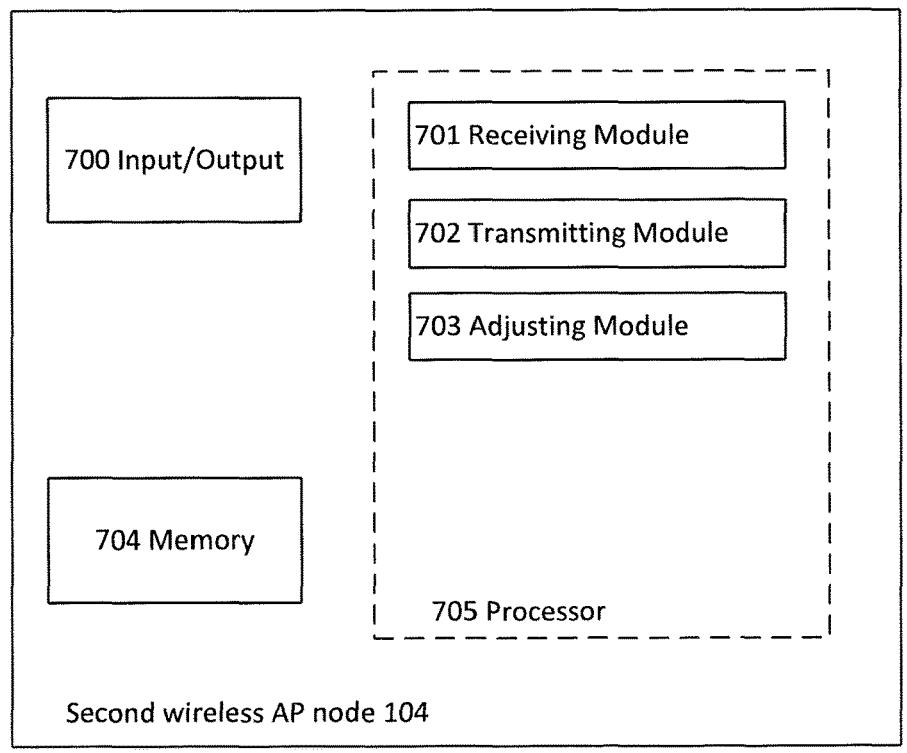
Fig. 7

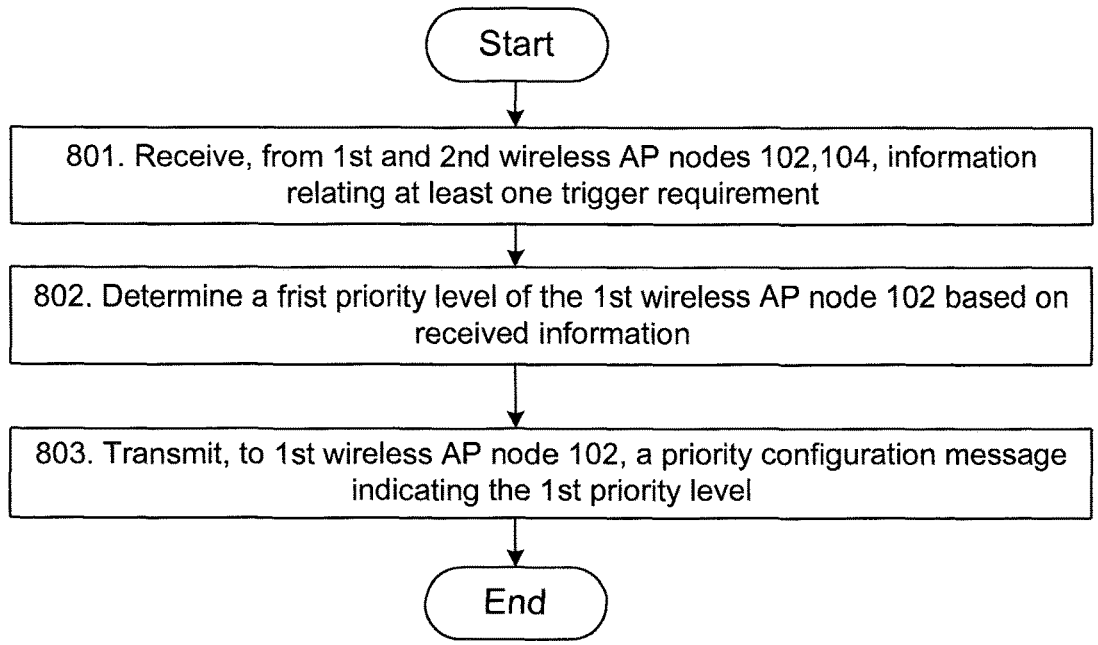
Fig. 8 Method in a management node 110
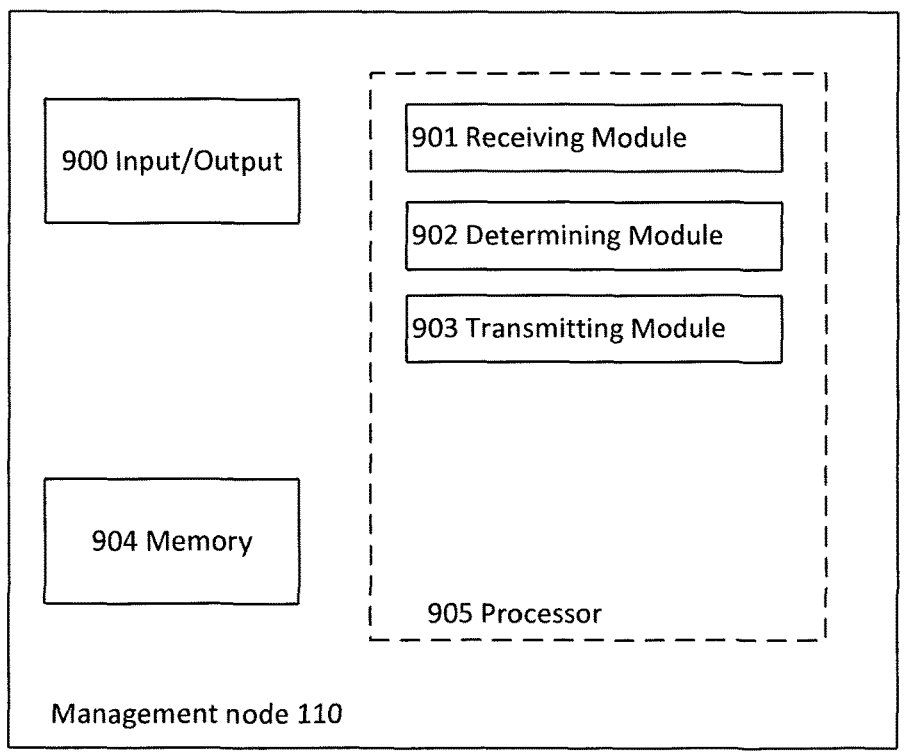
Fig. 9

PRIORITIZING RADIO RESOURCES BETWEEN OVERLAPPING WIRELESS ACCESS POINT NODES

PRIORITY

This nonprovisional application is a U.S. National Stage Filing under 35 U.S.C. § 371 of International Patent Application Serial No. PCT/SE2014/051510 filed Dec. 16, 2014, and entitled "Wireless Access Point Nodes, a Management Node and Methods Therein Controlling Radio Resource Usage."

TECHNICAL FIELD

Embodiments herein relate generally to a first wireless Access Point (AP) node, a second wireless AP node, a management node and to methods therein. In particular, they relate to controlling radio resource usage in a wireless communications network by the controlling usage of a Radio Frequency (RF) channel.

BACKGROUND

Communication devices such as terminals are also known as e.g. User Equipments (UE), mobile terminals, wireless devices, wireless terminals and/or mobile stations. Terminals are enabled to communicate wirelessly in a wireless communications network such as a cellular communications network, sometimes also referred to as a cellular radio system or cellular networks. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the terminals within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission is in LTE controlled by the radio base station.

The Institute of Electrical and Electronics Engineers (IEEE) 802.11 standard that defines the physical (PHY) layer and Media Access Control (MAC) layer for Wireless Local Area Networks (WLANs) specifies several different channel access mechanisms, such as the Distributed Coordination Function (DCF), the Point Coordination Function (PCF), and some variants of the Hybrid Coordination Function (HCF), etc.

The DCF is a MAC technique and requires a wireless device wishing to transmit to listen for the RF channel status for a Distributed (coordination function) lnterframe Space (DIFS) interval. If the RF channel is found busy during the DIFS interval, the wireless device defers its transmission. In a wireless communications network, wherein a number of wireless devices contend for the wireless medium, if multiple wireless devices sense that the channel is busy and defer their access, they will also virtually simultaneously find that the RF channel is released and then try to seize the channel. As a result, collisions may occur. In order to avoid such collisions, DCF also specifies random back off, which forces a wireless device to defer its access to the RF channel for an extra period of time.

The PCF is also a MAC technique and it resides in a point coordinator, such as an Access Point (AP), in order to coordinate the communication within the wireless communications network. The AP waits for a Point (coordination function) lnterframe Space (PIFS) duration rather than the DIFS duration before it tries to access the RF channel. The PIFS duration is less than the DIFS duration and hence the point coordinator, e.g. the AP, has a higher priority to access the RF channel than the wireless devices.

The IEEE 802.11e standard enhances the DCF and the PCF, through a new coordination function: the Hybrid Coordination Function (HCF). HCF combines functions from the DCF and PCF with some enhanced Quality of Service (QoS) specific mechanisms and frame subtypes to allow a uniform set of frame exchange sequences to be used for QoS data transfers. Within the HCF, there are two methods of channel access, similar to those defined in the legacy IEEE 802.11 MAC: HCF Controlled Channel Access (HCCA) and Enhanced Distributed Channel Access (EDCA). Both EDCA and HCCA define Traffic Categories (TC).

Even though the DCF, PCF, and HCF mechanisms mentioned above have been proposed and standardized by the IEEE, in practice virtually all current WLAN, sometimes herein also referred to as Wi-Fi, deployments are based on the DCF. The DCF, which is based on Carrier Sensing Multiple Access with Collision Avoidance (CSMA/CA), has achieved its popularity due to e.g. its robustness. CSMA/CA is a network multiple access method in which so called carrier sensing is used, but the nodes attempt to avoid collisions by transmitting only when the channel is sensed to be "idle". However, there are several drawbacks associated with the DCF. For example, some drawbacks are the uplink and/or downlink throughput imbalance as well as the imbalance between different wireless communications networks operating on the same Radio Frequency (RF) channel.

Thus, the state of the art WLANs are associated with some drawbacks such as the uplink and/or downlink throughput imbalance as well as the imbalance between different wireless communications networks operating on the same RF channel.

SUMMARY

Therefore, an object of embodiments herein is to provide a way of improving the performance in a wireless communications network.

According to a first aspect of embodiments herein, the object is achieved by a method in a first wireless Access Point (AP) node for controlling radio resource usage. The first wireless AP node has a first Radio Frequency (RF) coverage area that is at least partly overlapping with a second RF coverage area of a second wireless AP node. The first and second wireless AP nodes are operating on the same RF channel.

The first wireless AP node configures a first priority level of the first wireless AP node in relation to a second priority level of the second wireless AP node. The first and second priority levels are priority levels for accessing the RF channel.

Further, the first wireless AP node transmits, to a wireless device associated with the first wireless AP node, data via the RF channel in dependence of the first priority level. Thereby, the radio resource usage is controlled.

According to a second aspect of embodiments herein, the object is achieved by a first wireless AP node for controlling radio resource usage. The first wireless AP node is arranged to have a first RF coverage area that is at least partly overlapping with a second RF coverage area of a second wireless AP node. The first and second wireless AP nodes are arranged to operate on the same RF channel.

The first wireless AP node is configured to configure a first priority level of the first wireless AP node in relation to a second priority level of the second wireless AP node. The first and second priority levels are priority levels for accessing the RF channel.

Further, the first wireless AP node is configured to transmit, to a wireless device associated with the first wireless AP node, data via the RF channel in dependence of the first priority level. Thereby, the radio resource usage is controlled.

According to a third aspect of embodiments herein, the object is achieved by a method in a second wireless AP node for assisting in controlling radio resource usage. The second wireless AP node has a second RF coverage area that is at least partly overlapping with a first RF coverage area of a first wireless AP node. The first and second wireless AP nodes are operating on the same RF channel.

The second wireless AP node receives, from the first wireless AP node, a negotiation request message. The negotiation request message comprises information indicating a request for a first priority level of the first wireless AP node.

Further, the second wireless AP node transmits, to the first wireless AP node, a negotiation response message. The negotiation response message comprises information relating to the request for the first priority level. Thereby the second wireless AP node assists in controlling the radio resource usage.

According to a fourth aspect of embodiments herein, the object is achieved by a second wireless AP node for assisting in controlling radio resource usage. The second wireless AP node is arranged to have a second RF coverage area that is at least partly overlapping with a first RF coverage area of a first wireless AP node. The first and second wireless AP nodes are arranged to operate on the same RF channel.

The second wireless AP node is configured to receive, from the first wireless AP node, a negotiation request message. The negotiation request message comprises information indicating a request for a first priority level of the first wireless AP node.

Further, the second wireless AP node is configured to transmit, to the first wireless AP node, a negotiation response message. The negotiation response message comprises information relating to the request for the first priority level. Thereby the second wireless AP node is configured to assist in controlling the radio resource usage.

According to a fifth aspect of embodiments herein, the object is achieved by a method performed by a management node for controlling radio resource usage. A first wireless AP node has a first RF coverage area that is at least partly overlapping with a second RF coverage area of a second wireless AP node. The first and second wireless AP nodes are operating on the same RF channel.

The management node receives, from the first and/or second wireless AP nodes, information relating to at least one trigger requirement.

Further, the management node determines a first priority level of the first wireless AP node in relation to a second priority level of the second wireless AP node based on the received information from the first and/or second wireless AP nodes. The first and second priority levels are priority levels for accessing the RF channel.

Furthermore, the management node transmits, to the first wireless AP node, a priority configuration message. The priority configuration message comprises information indicating the first priority level of the first wireless AP node. Thereby, the management node controls the radio resource usage.

According to a sixth aspect of embodiments herein, the object is achieved by a management node for controlling radio resource usage. A first wireless AP node is arranged to have a first RF coverage area that is at least partly overlapping with a second RF coverage area of a second wireless AP node. The first and second wireless AP nodes are arranged to operate on the same RF channel.

The management node is configured to receive, from the first and/or second wireless AP nodes information relating to at least one trigger requirement.

Further, the management node is configured to determine a first priority level of the first wireless AP node in relation to a second priority level of the second wireless AP node based on the received information from the first and/or second wireless AP nodes. The first and second priority levels are priority levels for accessing the RF channel.

Furthermore, the management node is configured to transmit, to the first wireless AP node, a priority configuration message. The priority configuration message comprises information indicating the first priority level of the first wireless AP node. Thereby, the management node controls the radio resource usage.

According to a seventh aspect of embodiments herein, the object is achieved by a computer program, comprising instructions which, when executed on at least one processor, causes the at least one processor to carry out the method in the first wireless AP node.

According to an eighth aspect of embodiments herein, the object is achieved by a computer program, comprising instructions which, when executed on at least one processor, causes the at least one processor to carry out the method in the second wireless AP node.

According to a ninth aspect of embodiments herein, the object is achieved by a computer program, comprising instructions which, when executed on at least one processor, causes the at least one processor to carry out the method in the management node.

According to a tenth aspect of embodiments herein, the object is achieved by a carrier comprising the computer program, wherein the carrier is one of an electronic signal, optical signal, radio signal or computer readable storage medium.

Since the first wireless AP node configures a first priority level of the first wireless AP node in relation to a second priority level of the second wireless AP node, which first and second priority levels are priority levels for accessing the RF channel, and since the first wireless AP node transmits, to a wireless device associated with the first wireless AP node, data via the RF channel in dependence of the first priority level, the radio resource usage is controlled. Thereby the uplink and/or downlink throughput imbalance as well as the imbalance between different wireless communications networks operating on the same RF channel are reduced or overcome. This results in an improved performance in the wireless communications network.

An advantage by embodiments herein is that an AP comprised in an Overlapping Basic Service Set (OBSS), e.g. the first wireless AP node, which AP needs to serve a large number of wireless devices in downlink, can have a higher priority to access the wireless communication medium, e.g. the RF channel, as compared to other APs, e.g. the second wireless AP node, operating on the same RF channel. The higher priority may be set to be valid for a certain amount of time. This will reduce or sometimes even solve the imbalance in resource usage when several APs, e.g. the first and second wireless AP nodes, possibly comprised in different wireless communications networks, are competing for the wireless medium, e.g. the same RF channel.

BRIEF DESCRIPTION OF DRAWINGS

Examples of embodiments herein are described in more detail with reference to attached drawings in which:

FIG. 4 is a flowchart depicting embodiments of a method in a first wireless AP node;

FIG. 5 is a schematic block diagram illustrating embodiments of a first wireless AP node;

FIG. 6 is a flowchart depicting embodiments of a method in a second wireless AP node;

FIG. 7 is a schematic block diagram illustrating embodiments of a second wireless AP node;

FIG. 8 is a flowchart depicting embodiments of a method in a management node; and FIG. 9 is a schematic block diagram illustrating embodiments of a management node.

DETAILED DESCRIPTION

As part of developing embodiments herein, some problems will first be identified and discussed.

Figure 1:
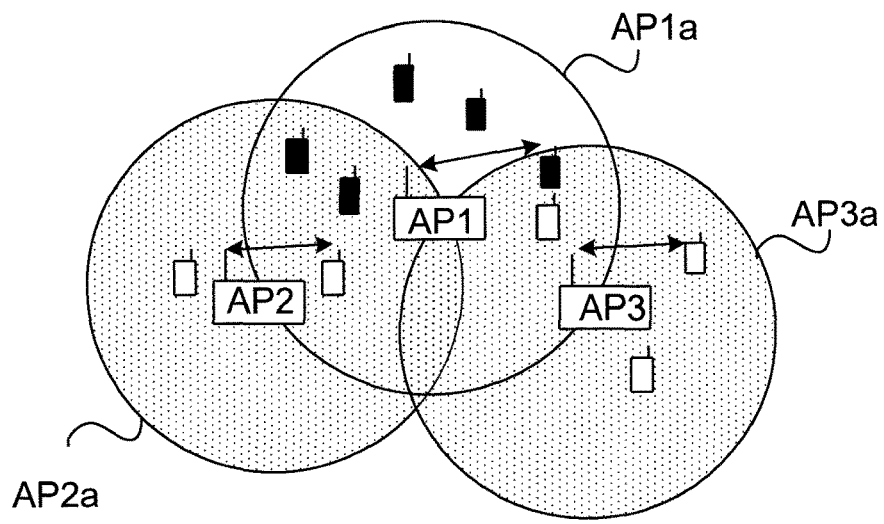
FIG. 1 schematically illustrates a wireless communications network according to prior art.

As previously mentioned, the state of the art WLANs are associated with some drawbacks such as the uplink and/or downlink throughput imbalance as well as the imbalance between different wireless communications networks operating on the same RF channel. In order to further explain the imbalance reference is made to FIG. 1. FIG. 1 schematically illustrates a wireless communications network according to the prior art. The communications network comprises several different WLAN APs, namely AP1, AP2, and AP3. The illustrated situation is often referred to as the Overlapping Basic Service Set (OBSS), since the coverage areas AP1a, AP2a, AP3a of the respective wireless AP nodes AP1, AP2, AP3 are overlapping. In this particular case, the three APs belongs to two different wireless communications network, e.g. two different WLANs. The first wireless communications network comprises the wireless AP node AP1, which may be identified by its Basic Service Set IDentifier (BSSID), e.g. BSSID1. The second wireless communications network comprises the two wireless AP nodes AP2 and AP3, which may be identified by their respective BBSID, e.g. BSSID2 and BSSID3, respectively. In order to schematically illustrate that the wireless AP nodes AP2,AP3 belong to the same wireless communications network, the RF coverage areas AP2a, AP3a are shown as dotted areas. However, it should be understood that the two or more wireless AP nodes may belong to the same wireless communications network.

As exemplified in FIG. 1, the AP node AP1 has a larger number of associated wireless devices than any of the other two wireless AP nodes AP2, AP3. In the illustrated example, AP1 has five associated wireless devices, AP2 has two associated wireless devices and AP3 has three associated wireless devices. However, it should be understood that the number of associated wireless devices for each of the AP nodes may be larger or lesser. Due to the nature of the DCF mechanism, the wireless AP nodes AP1, AP2, AP3 and all associated wireless devices will get an equal chance of accessing the wireless medium, e.g. the RF channel they are operating on. However, as exemplified, the wireless AP node AP1 happens to serve many more wireless devices than the wireless AP nodes AP2, AP3, which creates an unfair distribution of resources, in e.g. downlink (DL), between the two wireless communications networks.

Thus, the DCF mechanism, which is the most widely used channel access technique in a wireless communications network, e.g. a WLAN, lacks the capability to solve the resource distribution fairness issue between wireless communications networks operating on the same RF channel.

These and other shortcomings are addressed by embodiments herein.

Therefore, according to embodiments herein, a way of improving the performance in a wireless communications network is provided by controlling radio resource usage in the wireless communications network in order to overcome the uplink and/or downlink throughput imbalance as well as the imbalance between different wireless communications networks operating on the same RF channel.

Embodiments herein enables inter-AP prioritization. In other words, in embodiments herein, different wireless AP nodes may have different priority levels to access the RF channel on which they are operating. Each priority level may be valid for a certain, e.g. predefined or preset, amount of time. Further, the priority level may be set upon fulfilment of a certain set of conditions and/or upon successful negotiation with one or more neighbouring wireless AP nodes.

Below, embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

Figure 2:
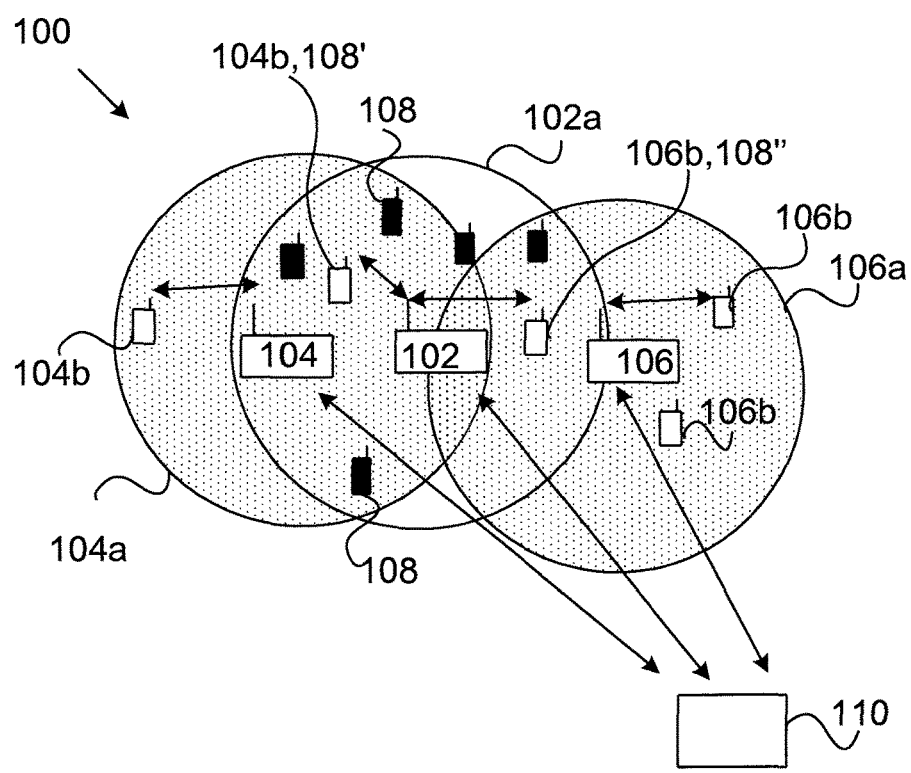
FIG. 2 schematically illustrates an embodiment of a wireless communications network.

FIG. 2 illustrates a wireless communications network 100 in which embodiments herein may be implemented. The wireless communications network 100 may comprise a Wireless Local Area Network (WLAN) and/or a cellular communications network. Thus, the wireless communications network 100 may be an integrated wireless communications network. Sometimes, the wireless communications network 100 is referred to as comprising two or more wireless communications sub-networks, which sub-networks may be different types of wireless communications networks or may be the same type of wireless communications network but belonging to different operators.

The WLAN may be any wireless computer network that by means of a wireless distribution method links two or more devices within a limited area such as a home, a school, a shopping mall, a coffee shop, a computer laboratory, or an office building. The wireless distribution method may be a spread-spectrum method or an Orthogonal Frequency-Division Multiplexing (OFDM) radio method. For example, the WLAN may be implemented according to the IEEE 802.11 standard. The IEEE 802.11 standard comprises a set of Media Access Control (MAC) and PHYsical layer (PHY) specifications for implementing WLAN computer communication in the 2.4, 3.6, 5 and 60 GHz frequency bands.

The cellular communications network or sub-networks may be a LTE network, any other 3GPP cellular network, Wimax, or any other cellular network or system.

Two or more wireless Access Point (AP) nodes, such as a first wireless Access Point (AP) node 102, a second wireless AP node 104, and possibly a third wireless AP node 106, operate in the wireless communications network 100. The wireless AP node 102,104,106 may be a WLAN AP node or a Licensed Assisted Access LTE (LAA-LTE) node. Sometimes herein, the terms "WLAN node", "AP node" and "LAA-LTE node" are used interchangeably.

In some embodiments, the first, second and/or third wireless AP nodes 102,104,106 are different types of wireless AP nodes. For example, the first wireless AP node 102 may be a WLAN AP node and the second or third wireless AP node 104,106 may be a LLA-LTE node, or vice versa. However, the first, second and third wireless AP nodes 102,104,106 may be the same type of wireless AP node. For example, the first, second and/or third wireless AP nodes 102,104,106 may be WLAN AP nodes or LLA-LTE nodes.

In the embodiment schematically illustrated in FIG. 2, the first wireless AP node 102 is of a first type of wireless AP node belonging to a first wireless communications sub-network, and the second and third wireless AP nodes 104, 106 are of a second type of wireless AP nodes belonging to a second wireless communications sub-network. Therefore, the coverage areas 102a,104a of the second and third wireless AP nodes 102,104 are schematically illustrated as dotted areas.

Further, the wireless AP node 102,104,106 is a device that allows one or more wireless devices to connect to a wired network using or related standards. The wireless AP node 102,104,106 may connect to a router (not shown) via a wired network but it may also be an integral component of the router itself.

Further, the first wireless AP node 102 is configured to communicate with a wireless device 108 when the wireless device 108 supports communication with the first wireless AP node 102 and when the wireless device 108 is within a first Radio Frequency, RF, coverage area 102a of the first wireless AP node 102. In FIG. 2, several wireless devices 108 are illustrated as filled black rectangular boxes.

The second wireless AP node 104 is configured to communicate with a wireless device 104b, when the wireless device 104b supports communication with the second wireless AP node 104 and when the wireless device 104b is within a second RF coverage area 104a of the second wireless AP node 104.

The third wireless AP node 106 is configured to communicate with a wireless device 106b, when the wireless device 106b supports communication with the third wireless AP node 106 and when the wireless device 106b is within a third RF coverage area 106a of the third wireless AP node 106.

In some embodiments, the first RF coverage area 102a is at least partly overlapping with the second RF coverage area 104a and the first and second wireless AP nodes 102,104 are operating on the same RF channel. However, the first RF coverage area 102a may also be at least partly overlapping with the third RF coverage area 106a and the first and third wireless AP nodes 102,106 may be operating on the same RF channel.

Further, in the FIG. 2, it is schematically illustrated that the wireless devices 104b, 104c located within the respective second and third RF coverage areas 104a, 106a and located within the first RF coverage area 102a are also referred to using the reference number 108' and 108", respectively. Thereby, indicating that the first wireless AP node 102 is configured to communicate with the wireless devices 104b, 108' of the second RF coverage area 104a and the wireless devices 106b, 108" of the third RF coverage area 106a, respectively, when the wireless devices 104b, 106b also are located within the first RF coverage area 102 and are supporting communication with the first wireless AP node 102.

The wireless devices 108,104b, 108', 106b, 108" herein also referred to as a user equipment or UE, operate in the wireless communications network 100. The wireless device 108, 104b, 108', 106b, 108" may e.g. be a user equipment, a mobile terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in the wireless communications network 100. Please note that the term user equipment used in this document also covers other wireless devices such as Machine to Machine (M2M) devices, even though they do not have any user.

Further, it should be understood that in embodiments wherein the wireless communications network 100 comprises a cellular communications network, the wireless AP node, such as the first, second or third wireless AP node 102,104,106, may be a radio network node for wireless communication with one or more wireless devices, such as the wireless devices 108, 104b, 106b, when they are located within a geographical area, such as the first, second, or third coverage areas 102a, 104a, 106a served by the radio network node.

The radio network node may be a transmission point such as a radio base station, for example an eNB, an eNodeB, or a Home Node B, a Home eNode B or any other network node capable to serve a user equipment or a machine type communication device in the cellular communications network.

A management node 110 may also operate in the wireless communications network 100. This is schematically illustrated in FIG. 2.

In some embodiments, the management node 110 is an Access Controller (AC) operating in the WLAN. However, the management node 100 may also be an Operation Support System (OSS) operating in the cellular communications network.

The management node 110 may communicate with the first wireless AP node 102, the second wireless AP node 104 and/or the third wireless AP node 106 via a radio communication link, a wired link, such as a backhaul link, or via a wireless device acting as a relay node.

Figure 3:
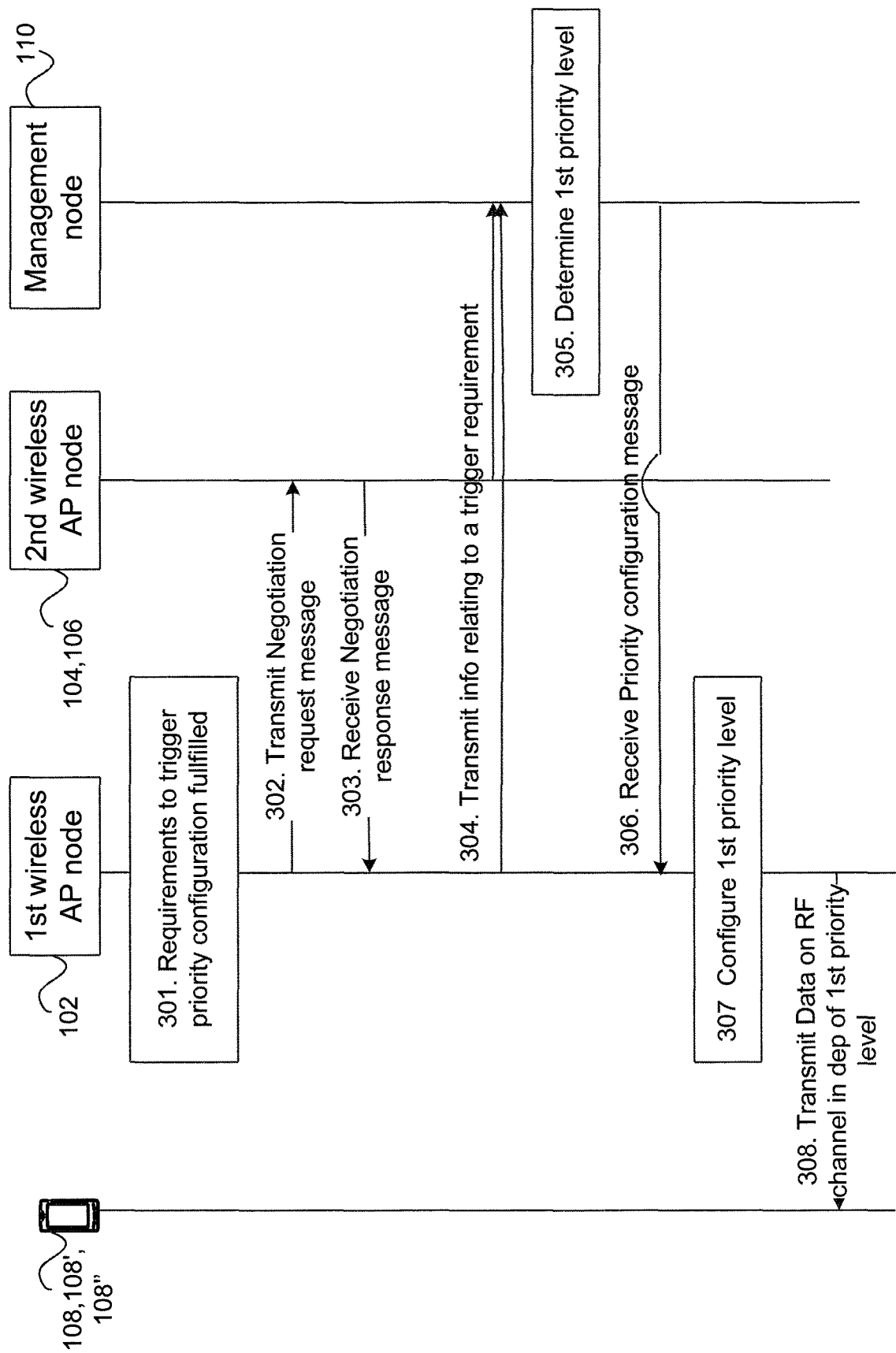
FIG. 3 is a schematic combined flowchart and signalling scheme of embodiments of a wireless communications network.

A method performed in embodiments in the wireless communications network 100 for controlling radio resource usage will now be described with reference to a schematic combined flowchart and signalling scheme of FIG. 3. As mentioned above, the first wireless AP node 102 has the first RF coverage area 102a that is at least partly overlapping with the second RF coverage area 104a of the second wireless AP node 104. Further, the first and second wireless AP nodes 102,104 are operating on the same RF channel.

The method comprises one or more of the following actions. It should be understood that some actions are optional, that actions may be taken in another suitable order and that actions may be combined. For example, according to some general embodiments, the Actions 307 and 308 mentioned below are performed. In some embodiments comprising e.g. a negotiation between the first and second wireless AP nodes 102,104, the Actions 301-303, 307 and 308 mentioned below are performed. Further, in some embodiments comprising e.g. a management node controlled priority configuration the Actions 304-308 mentioned below are performed. Furthermore, in some other embodiments, the Actions 301-308 mentioned below may be combined in another suitable way.

Action 301

In some embodiments, the first wireless AP node 102 detects or receives information that one or more requirement to trigger priority configuration is fulfilled. The one or more trigger requirements may indicate that an uplink and/or downlink imbalance between the first and second wireless AP nodes 104,106 exists or that an imbalance between different wireless communications networkers operating on the same RF channel exists.

The one or more trigger requirement may be one or more of: the number of wireless devices 108 associated with the first wireless AP node 102 exceeds a threshold value; the number of active wireless devices 108 associated with the first wireless AP node 102 exceeds a threshold value; the percentage of airtime the first wireless AP node 102 accesses the RF channel exceeds a threshold value; the percentage of airtime the first wireless AP node 102 requires for serving the associated wireless devices 108 exceeds a threshold value; the number of overheard wireless devices 104b, 108'; 106b, 108" and/or overheard wireless AP nodes 106 from other Basic Service Sets (BSSs) exceeds a threshold value; and throughput statistics of one or more wireless devices 108 associated with the first wireless AP node 102 exceed a threshold value.

The throughput statistics may comprise one or more of: cumulative traffic load, e.g. expressed as the portion of the traffic currently used by all connected wireless devices 108 compared to the traffic capacity of the first wireless AP node 102; the average traffic load per wireless device 108, the average user throughput during a given period time in history; and the percentile user throughput during a given period time of history.

Action 302

The first wireless AP node 102 may transmit a negotiation request message to the second wireless AP node 104. This may be done in order to solve the uplink and/or downlink imbalance between the first and second wireless AP nodes 104,106 or the imbalance between different wireless communications networkers operating on the same RF channel. Further, the first wireless AP node 102 may transmit the negotiation request message when it has detected or received information about or relating to the trigger requirement as mentioned in Action 301 above.

The negotiation request message may comprise information indicating a request for a first priority level. For example, the first wireless AP node 102 may request to have a higher priority level as compared to the priority level of the second wireless AP node 104. In other words, the first wireless AP node 102 may request to have a higher priority to access the RF channel than the second wireless AP node 104.

This Action relates to Action 401 which will be described below.

Action 303

In response to the transmitted negotiation request message, the first wireless AP node 102 may receive a negotiation response message from the second wireless AP node 104. In other words, in response to the received negotiation request message the second wireless AP node 104 may transmit a negotiation response message to the first wireless AP node 102.

The negotiation response message may comprise information relating to the request for the first priority level of the first wireless AP node 102. For example, the second wireless AP node 104 may grant the request from the first wireless AP node 102 to have a priority level that is higher than the priority level of the second wireless AP node 104. In response to the negotiation response message granting the request, the first wireless AP node 102 may configure the first priority level, as will be described in Action 307 below. Thereby, the uplink and/or downlink imbalance between the first and second wireless AP nodes 104,106 or the imbalance between different wireless communications networkers operating on the same RF channel may be reduced or overcome.

The Action 303 relates to Action 402 which will be described below.

Action 304

As an alternative to the Actions 301-303 described above, the first and/or second wireless AP node 102,104 may transmit information relating to one or more trigger requirements to a management node 110. In other words, the management node 110 may receive information relating to one or more trigger requirements from the first and/or second wireless AP node 102,104.

The information relating to one or more trigger requirements may comprise information such as the number of wireless devices 108,104b associated with the first and/or second wireless AP node 102,104 exceed a threshold value; the number of active wireless devices 108,104b associated with the first and/or second wireless AP node 102,104 exceeds a threshold value; the percentage of airtime the first and/or second wireless AP node 102,104 accesses the RF channel exceeds a threshold value; the percentage of airtime the first and/or second wireless AP node 102,104 requires for serving one or more associated wireless devices 108,104b exceeds a threshold value; the number of overheard wireless devices 106b, 108" and/or overheard wireless AP nodes 106 from one or more other Basic Service Sets (BSSs) exceeds a threshold value; and throughput statistics of one or more wireless devices 108,104b associated with the first and/or second wireless AP node 102,104 exceed a threshold value.

This action relates to Actions 403 and 801 which will be described below.

Action 305

In response to the received information relating to one or more trigger requirements, as mentioned in Action 304, the management node 110 determines a first priority level of the first wireless AP node 102 in relation to a second priority level of the second wireless AP node 104.

The first priority level is determined based on the received information from the first and/or second wireless AP nodes 102,104. The first and second priority levels are priority levels for accessing the RF channel, which RF channel they both are operating on.

The Action 305 relates to Action 802 which will be described below.

Action 306

When the management node 110 has determined the first priority level it transmits a priority configuration message to the first wireless AP node 102. In other words, the first wireless AP node 102 receives a priority configuration message from the management node 110. The priority configuration message comprises information indicating the first priority level of the first wireless AP node 102. In dependence on the received priority configuration message, the first wireless AP node 102 may configure the first priority level, as will be described in Action 307 below. Thereby, the management node 110 may reduce or overcome the uplink and/or downlink imbalance between the first and second wireless AP nodes 104,106 or the imbalance between different wireless communications networkers operating on the same RF channel.

The Action 306 relates to Action 803 which will be described below.

Action 307

The first wireless AP node 102 configures the first priority level of the first wireless AP node 102 in relation to a second priority level of the second wireless AP node 104. Thereby, the uplink and/or downlink imbalance between the first and second wireless AP nodes 104,106 or the imbalance between different wireless communications networkers operating on the same RF channel may be reduced or overcome.

In embodiments comprising negotiation of priority between the first and second wireless AP nodes 102,104, the first wireless AP node 102 may configure the first priority level based on the negotiation response message received in Action 303 above.

However, in embodiments comprising management node controlled priority configuration, the first wireless AP node 102 may configure the first priority level based on the priority configuration message received in Action 306 above.

The Action 307 relates Action 405 which will be described below.

Action 308

When the first priority level has been configured as mentioned in Action 307 above, the first wireless AP node 102 transmits, to a wireless device 108 associated with the first wireless AP node 102, data via the RF channel in dependence of the first priority level. Thereby, the radio resource usage is controlled.

The Action 308 relates to Action 406 which will be described below.

A method performed by a first wireless AP node 102 for controlling radio resource usage will now be described with reference to a flow chart depicted in FIG. 4. As mentioned above, the first wireless AP node 102 has the first RF coverage area 102a that is at least partly overlapping with the second RF coverage area 104a of the second wireless AP node 104 and the first and second wireless AP nodes 102,104 are operating on the same RF channel. The method comprises one or more of the following actions. It should be understood that some actions may be optional, that actions may be taken in another suitable order and that actions may be combined.

Action 401

In embodiments comprising a negotiation of the first priority level between the first wireless AP node 102 and the second wireless AP node 104, the first wireless AP node 102 transmits a negotiation request message to the second wireless AP node 104. The negotiation request message comprises information indicating a request for the first priority level.

In some embodiments, the first wireless AP node 102 transmits the negotiation request message when at least one trigger requirement is fulfilled.

The at least one trigger requirement may be one or more of: the number of wireless devices 108 associated with the first wireless AP node 102 exceeds a threshold value; the number of active wireless devices 108 associated with the first wireless AP node 102 exceeds a threshold value; the percentage of airtime the first wireless AP node 102 accesses the RF channel exceeds a threshold value; the percentage of airtime the first wireless AP node 102 requires for serving the associated wireless devices 108 exceeds a threshold value; the number of overheard wireless devices 104b, 108'; 106b, 108" and/or overheard wireless AP nodes 106 from one or more other BSSs exceeds a threshold value; and throughput statistics of one or more wireless devices 108 associated with the first wireless AP node 102 exceed a threshold value.

As mentioned above in relation to Action 302, the throughput statistics may comprise one or more of: cumulative traffic load, e.g. expressed as the portion of the traffic currently used by all connected wireless devices 108 compared to the traffic capacity of the first wireless AP node 102; the average traffic load per wireless device 108, the average user throughput during a given period time in history; and the percentile user throughput during a given period time of history.

Further, in some embodiments, the negotiation request message comprises information relating to the at least one trigger requirement. However, it should be understood that in some other embodiment, the negotiation request message does not comprise any more information than the request itself. In such embodiments, the second wireless AP node 104 that receives the negotiation request message will understand that the one or more of the trigger requirements have been fulfilled in the first wireless AP node 102 that sends the negotiation request message. With this approach, the amount of information exchange between the APs is minimized.

The request for the first priority level may be a request for permission to operate in a different priority mode, wherein the first priority level of the first wireless AP node 102 is different from the second priority level of the second wireless AP node 104. For example, the request for the first priority level may be a request to operate in a higher priority mode than the priority mode the second wireless AP mode 104 is operating in. If such request is granted, the first wireless AP node 102 will have higher priority to access the RF channel than the second wireless AP node 104.

In some embodiments, the negotiation request message comprises information relating to a period of time during which period the first wireless AP node 102 wants the first priority level to be valid.

The first wireless AP node 102 may transmit the negotiation request message to the second wireless AP node 104 via a radio communication link, a wired link, such as a backhaul link, or via one or more communication devices, e.g. wireless devices 104b, 108', acting as a relay node.

In other words, if the APs, e.g. the first and second wireless AP nodes 102,104, are in the radio communication range of each other, the priority negotiation messages may be exchanged through direct radio communication between the APs. For example, the negotiation message may be carried by a 802.11 management frame. A new type of probe request frame may be defined for the information exchange between the APs. An alternative approach is to exchange the messages through backhaul link of the APs. The backhaul link may either directly connect the APs, or indirectly connect the APs via a common central management node, e.g. the management node 110. One example of a backhaul link is the interface between an AP and an AC. Control And Provisioning of Wireless Access Points (CAPWAP) protocol is an example protocol that enables the communication between an AP and an AC. A third alternative to exchange the message is to use a mobile station, e.g. a wireless device, as a relay node.

Action 402

In embodiments comprising a negotiation of the first priority level between the first wireless AP node 102 and the second wireless AP node 104, the first wireless AP node 102 receives a negotiation response message from the second wireless AP node 104. The negotiation response message is sent by the second wireless AP node 104 in response to the negotiation request message. Further, the negotiation response message comprises information relating to the request for the first priority level of the first wireless AP node 102. The information may comprise a grant or a refusal of the request for the first priority level. In some embodiments, when the second wireless AP node 104 cannot grant the request for the first priority level, the information may comprise a suggested first priority level that is different from the requested first priority level but is a priority level the second wireless AP node 104 may grant.

The negotiation response message may further comprise a period of time during which the first priority level is valid.

The first wireless AP node 102 may receive the negotiation response message from the second wireless AP node 104 via the radio communication link, the wired link, e.g. the backhaul link, or via the one or more wireless devices 104,108' acting as the relay node. In other words, and as mentioned above, if the APs, e.g. the first and second wireless AP nodes 102,104, are in the radio communication range of each other, the priority negotiation messages may be exchanged through direct radio communication between the APs. For example and as previously mentioned, the negotiation message may be carried by a 802.11 management frame. A new type of probe request frame may be defined for the information exchange between the APs. An alternative approach is to exchange the messages through backhaul link of the APs. The backhaul link may either directly connect the APs, or indirectly connect the APs via a common central management node, e.g. the management node 110. One example of a backhaul link is the interface between an AP and an AC. CAPWAP protocol is an example protocol that enables the communication between an AP and an AC. A third alternative to exchange the message is to use a mobile station, e.g. a wireless device, as a relay node.

Action 403

In embodiments comprising a priority configuration that is controlled by the management node 110, the first wireless AP node 102 transmits information relating at least one trigger requirement to the management node 110. The first wireless AP node 102 may transmit the information to the management node 110 using the CAPWAP protocol. As previously mentioned, the CAPWAP protocol is an example protocol that enables the communication between an AP and a management node, e.g. an AC.

Action 404

In embodiments comprising a priority configuration that is controlled by the management node 110 as mentioned in Action 403 above, the first wireless AP node 102 receives a priority configuration message from the management node 110. The priority configuration message comprises information indicating the first priority level of the first wireless AP node 102.

The priority configuration message may further comprise information relating to a period of time during which the first priority level of the first wireless AP node 102 is valid.

The first wireless AP node 102 may receive the priority configuration message from the management node 110 using the CAPWAP protocol. As previously mentioned, the CAPWAP protocol is an example protocol that enables the communication between the AP and the management node, e.g. an AC.

Action 405

The first wireless AP node 102 configures a first priority level of the first wireless AP node 102 in relation to a second priority level of the second wireless AP node 104, which first and second priority levels are priority levels for accessing the RF channel.

In some embodiments, when the first priority level of the first wireless AP node 102 has changed in relation to the second priority level of the second wireless AP node 104, 106, the first wireless AP node 102 configures the first priority level by further adjusting one or more CSMA/CA parameters, such as one or more of: Inter-Frame Spacing (IFS), Contention Window Maximum size (CWmax), Contention Window Minimum size (CWmin), Transmitting (TX) power; and Clear Channel Assessment Threshold (CCAT).

In some embodiments, the first wireless AP node 102 configures the first priority level to be valid for a certain, e.g. predefined, period of time.

The first wireless AP node 102 may configure the first priority level for at least one type of service. For example, the first priority level may be configured to be valid for real-time services, like voice and/or video calling, or subscriptions with higher priorities, e.g. golden users.

In embodiments comprising a negotiation of priority level between the first and a second wireless AP node 102,104, as described in relation to Actions 401 and 402 above, the first wireless AP node 102 configures the first priority level based on the negotiation response message received from the second wireless AP node 104. With reference to FIG. 2, upon fulfilment of some requirements, AP1, e.g. the first wireless AP node 102, may initiate a priority negotiation request to its overlapping neighbour AP(s), e.g. the second wireless AP node 104 and possibly also to the possible third wireless AP node 106. Once the request is received and processed, the overlapping neighbour AP(s) may send back a response to the first AP to accept or reject the request. If the request is accepted, certain parameters will be reconfigures in the AP1 and/or the overlapping neighbour AP(s) to realize the negotiated priority.

In embodiments comprising a priority configuration that is controlled by the management node 110 as described in relation to Actions 403 and 404 above, the first wireless AP node 102 configures the first priority level based on the received priority configuration message.

Action 406

The first wireless AP node 102 transmits, to a wireless device 108 associated with the first wireless AP node 102, data via the RF channel in dependence of the first priority level. Thereby, the radio resource usage is controlled.

The first wireless AP node 102 may transmit the data to the wireless device 108 using a WLAN communication protocol such as 802.11a, 802.11b, 802.11n and 802.11ac just to mentioned some examples of protocols for the data transmission.

To perform the method for controlling radio resource usage, the first wireless AP node 102 may comprise an arrangement depicted in FIG. 5. As previously mentioned, the first wireless AP node 102 is arranged to have the first RF coverage area 102a that is at least partly overlapping with the second RF coverage area 104a of the second wireless AP node 104. Further, the first and second wireless AP nodes 102,104 are arranged to operate on the same RF channel.

In some embodiments, the first wireless AP node 102 comprises an input and/or output interface 500 configured to communicate with one or more other wireless AP nodes, such as the second and/or third wireless AP nodes 104,106, one or more other network nodes, such as the management node 110 or one or more communications devices, such as one of more of the wireless devices 108,108',108". The input and/or output interface 500 may comprise a wireless receiver and a wireless transmitter.

The first wireless AP node 102 is configured to transmit, e.g. by means of a transmitting module 501, data to the wireless device 108 associated with the first wireless AP node 102. The first wireless AP node 102 is further configured to transmit the data via the RF channel in dependence of the first priority level. Thereby, the radio resource usage is controlled. The transmitting module 501 may be the wireless transmitter or a processor 505 of the first wireless AP node 102. The processor 505 will be described in more detail below.

In embodiments comprising a negotiation of the first priority level between the first wireless AP node 102 and the second wireless AP node 104, the first wireless AP node 102, is further configured to transmit, to the second wireless AP node 104, a negotiation request message. The negotiation request message comprises information indicating a request for the first priority level.

The first wireless AP node 102 may further be configured to transmit the negotiation request message when at least one trigger requirement is fulfilled.

As previous mentioned, the at least one trigger requirement may be one or more of: the number of wireless devices 108 associated with the first wireless AP node 102 exceeds a threshold value; the number of active wireless devices 108 associated with the first wireless AP node 102 exceeds a threshold value; the percentage of airtime the first wireless AP node 102 accesses the RF channel exceeds a threshold value; the percentage of airtime the first wireless AP node 102 requires for serving the associated wireless devices 108 exceeds a threshold value; the number of overheard wireless devices 104b, 108'; 106b, 108" and/or overheard wireless AP nodes 106 from one or more other BSSs exceeds a threshold value; and throughput statistics of one or more wireless devices 108 associated with the first wireless AP node 102 exceed a threshold value.

In some embodiments, the negotiation request message is arranged to comprise information relating to the at least one trigger requirement.

Further, the request for the first priority level may be a request for permission to operate in a different priority mode, wherein the first priority level of the first wireless AP node 102 is different from the second priority level of the second wireless AP node 104.

In some embodiments, the first wireless AP node 102 is configured to transmit the negotiation request message to the second wireless AP node 104 via a radio communication link, a wired link, e.g. a backhaul link, or via a wireless device 104b, 108' acting as a relay node.

In embodiments comprising a priority configuration that is controlled by the management node 110, the first wireless AP node 102 is configured to transmit, to the management node 110, information relating at least one trigger requirement. As will be described below, the management node 110 may determine the first priority level based on the received information.

The first wireless AP node 102 may further be configured to receive, e.g. by means of a receiving module 502, a message from the second wireless AP node 104 and/or the management node 110. The receiving module 502 may be the wireless receiver or the processor 505 of the first wireless AP node 102.

In embodiments comprising a negotiation of the first priority level between the first wireless AP node 102 and the second wireless AP node 104, the first wireless AP node 102 is further configured to receive, from the second wireless AP node 104, a negotiation response message. In such embodiments, the negotiation response message is arranged to comprise information relating to the request for the first priority level of the first wireless AP node 102. For example, the negotiation response message may comprise a grant or a refusal of the request for the first priority level. In some embodiments, when the second wireless AP node 104 cannot grant the request for the first priority level, the negotiation response message may comprise a suggested priority level, which is different from the first priority level but is a priority level the second wireless AP node 104 can grant. The negotiation response message may further comprise a period of time during which the first priority level is valid.

The first wireless AP node 102 may further be configured to receive the negotiation response message from the second wireless AP node 104 via the radio communication link, the wired link, e.g. the backhaul link, or via the wireless device 104b, 108' acting as the relay node.

In embodiments comprising a priority configuration that is controlled by the management node 110, the first wireless AP node 102 is further configured to receive, from the management node 110, a priority configuration message. The priority configuration message comprises information indicating the first priority level of the first wireless AP node 102. Further, the priority configuration message may comprise information relating to a period of time during which period the first priority level is valid.

The first wireless AP node 102 is further configured to configure, e.g. by means of a configuring module 503, the first priority level of the first wireless AP node 102 in relation to a second priority level of the second wireless AP node 104. The first and second priority levels are priority levels for accessing the RF channel.

The configuring module 503 may be the processor 505 of the first wireless AP node 102.

In some embodiments, when the first priority level of the first wireless AP node 102 has changed in relation to the second priority level of the second wireless AP node 104, 106, the first wireless AP node 102 is further configured to adjust one or more CSMA/CA parameters, such as one or more of: IFS, CWmax, CWmin, TX power, and CCAT.

The first wireless AP node 102 may be configured to configure the first priority level for at least one type of service.

In embodiments comprising a negotiation of the first priority level between the first wireless AP node 102 and the second wireless AP node 104, the first wireless AP node 102 is further configured to configure the first priority level based on the negotiation response message received from the second wireless AP node 104.

In embodiments comprising a priority configuration that is controlled by the management node 110, the first wireless AP node 102 is further configured to configure the first priority level based on the received priority configuration message. The priority configuration message may further comprise information relating to a period of time during which the first priority level of the first wireless AP node 102 is valid.

The first wireless AP node 102 may also comprise means for storing data such as user code data, e.g. information relating to neighbouring AP nodes, wireless devices, priority levels, trigger events, period of times during which one or more priority levels are valid, etc. In some embodiments, the first wireless AP node 102 comprises a memory 504 configured to store the data. The user code data may be processed or non-processed user code data or data and/or information relating thereto. The memory 504 may comprise one or more memory units. Further, the memory 504 may be a computer data storage or a semiconductor memory such as a computer memory, a read-only memory, a volatile memory or a non-volatile memory. The memory 504 is arranged to be used to store obtained information, data, configurations, schedulings, and applications etc. to perform the methods herein when being executed in the first wireless AP node 102.

Embodiments herein for controlling radio resource usage may be implemented through one or more processors, such as the processor 505 in the arrangement depicted in FIG. 5, together with computer program code for performing the functions and/or method actions of embodiments herein. The program code mentioned above may also be provided as a computer program product, for instance in the form of a data carrier carrying computer program code for performing the embodiments herein when being loaded into the first wireless AP node 102. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the first wireless AP node 102.

Those skilled in the art will also appreciate that the transmitting module, receiving module, and configuring module described above may refer to a combination of analog and digital circuits, and/or one or more processors configured with software and/or firmware, e.g. stored in the memory, that when executed by the one or more processors such as the processors in the first wireless AP node 102 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

A method performed by a second wireless AP node 104 for assisting in controlling radio resource usage will now be described with reference to a flow chart depicted in FIG. 6. As mentioned above, the first wireless AP node 102 has the first RF coverage area 102a that is at least partly overlapping with the second RF coverage area 104a of the second wireless AP node 104 and the first and second wireless AP nodes 102,104 are operating on the same RF channel.

The method comprises one or more of the following actions. It should be understood that actions may be taken in another suitable order and that actions may be combined. According to some embodiments, the actions described below are performed in embodiments comprising a negotiation of the first priority level between the first wireless AP node 102 and the second wireless AP node 104.

Action 601

The second wireless AP node 104 receives a negotiation request message from the first wireless AP node 102. The negotiation request message comprises information indicating a request for a first priority level of the first wireless AP node 102.

In some embodiments, the second wireless AP node 104 receives the negotiation request message when at least one trigger requirement is fulfilled.

As previously mentioned, the at least one trigger requirement may be one or more of: the number of wireless devices 108 associated with the first wireless AP node 102 exceed a threshold value; the number of active wireless devices 108 associated with the first wireless AP node 102 exceeds a threshold value; the percentage of airtime the first wireless AP node 102 accesses the RF channel exceeds a threshold value; the percentage of airtime the first wireless AP node 102 requires for serving one or more associated wireless devices 108 exceeds a threshold value; the number of overheard wireless devices 104b, 108'; 106b, 108" and/or overheard wireless AP nodes 106 from other BSSs exceeds a threshold value; and throughput statistics of one or more wireless devices 108 associated with the first wireless AP node 102 exceed a threshold value.

Further, the negotiation request message may comprise information relating to the at least one trigger requirement.

In some embodiments, the request for the first priority level is a request for permission to operate in a different priority mode, wherein the first priority level of the first wireless AP node 102 is different from the second priority level of the second wireless AP node 104.

The negotiation request message may further comprise information relating to a period of time during which the first wireless AP node 102 wants the first priority level to be valid.

The second wireless AP node 104 may receive the negotiation request message from the first wireless AP node 102 via a radio communication link, a wired link, e.g. a backhaul link, or via the wireless device 104b, 108' acting as a relay node.

Action 602

In response to the received negotiation request message, the second wireless AP node 104 transmits a negotiation response message to the first wireless AP node 102. The negotiation response message comprises information relating to the request for the first priority level. For example, the negotiation response message may comprise a grant or a refusal of a requested priority level. Further, the negotiation response message may comprise information relating to a period of time during which the first priority level of the first wireless AP node 102 is valid. In some embodiments and as previously mentioned, when the second wireless AP node 104 cannot grant the request priority level, the negotiation response message comprises a suggest priority level which is different from the request priority level but is a priority level the second wireless AP node 104 can grant.

The second wireless AP node 104 may transmit the negotiation response message to the first wireless AP node 102 via the radio communication link, the wired link, e.g. the backhaul link, or via the wireless device 104b, 108' acting as the relay node.

Action 603

When the first priority level of the first wireless AP node 102 has changed in relation to the second priority level of the second wireless AP node 104, the second wireless AP node 104 may adjust one or more CSMA/CA parameters, such as one or more of: IFS, CWmax, CWmin, TX power, COAT.

To perform the method for assisting in controlling radio resource usage, the second wireless AP node 104 may comprise an arrangement depicted in FIG. 7. As previously mentioned, the first wireless AP node 102 is arranged to have the first RF coverage area 102a that is at least partly overlapping with the second RF coverage area 104a of the second wireless AP node 104. Further, the first and second wireless AP nodes 102,104 are arranged to operate on the same RF channel.

In some embodiments, the second wireless AP node 104 comprises an input and/or output interface 700 configured to communicate with one or more other wireless AP nodes, such as the first and third wireless AP nodes 102,106, one or more other network nodes, such as the management node 110 or one or more communications devices, such as the wireless device 104b. The input and/or output interface 700 may comprise a wireless receiver and a wireless transmitter.

The second wireless AP node 104 may further be configured to receive, e.g. by means of a receiving module 701, a message from the first wireless AP node 102 and/or the management node 110. The receiving module 701 may be the wireless receiver or a processor 705 of the second wireless AP node 104. The processor 705 will be described in more detail below.

The second wireless AP node 104 is configured to receive, from the first wireless AP node 102, a negotiation request message. The negotiation request message comprises information indicating a request for the first priority level of the first wireless AP node 102.

In some embodiments, the second wireless AP node 104 is further configured to receive the negotiation request message when at least one trigger requirement is fulfilled.

As previously mentioned, the at least one trigger requirement may be one or more of: the number of wireless devices 108 associated with the first wireless AP node 102 exceed a threshold value; the number of active wireless devices 108 associated with the first wireless AP node 102 exceeds a threshold value; the percentage of airtime the first wireless AP node 102 accesses the RF channel exceeds a threshold value; the percentage of airtime the first wireless AP node 102 requires for serving one or more associated wireless devices 108 exceeds a threshold value; the number of overheard wireless devices 104b, 108' and/or overheard wireless AP nodes 106 from other BSSs exceeds a threshold value; and throughput statistics of one or more wireless devices 108 associated with the first wireless AP node 102 exceed a threshold value.

The negotiation request message comprises information relating to the at least one trigger requirement. The negotiation request message may be arranged to alternatively or in addition also comprise information relating to the period of time the first wireless AP node 102 wants the request first priority level to be valid.

Further, the request for the first priority level may be a request for permission to operate in a different priority mode, wherein the first priority level of the first wireless AP node 102 is different from the second priority level of the second wireless AP node 104.

In some embodiments, the second wireless AP node 104 is configured to receive the negotiation request message from the first wireless AP node 102 via a radio communication link, a wired link, e.g. a backhaul link, or via a communication device, e.g. the wireless device 104b, 108', acting as a relay node.

The second wireless AP node 104 is configured to transmit, e.g. by means of a transmitting module 702, a negotiation response message to the first wireless AP node 102. The negotiation response message comprises information relating to the request for the first priority level. The transmitting module 702 may be the wireless transmitter or the processor 705 of the second wireless AP node 104.

In some embodiments, the negotiation response message comprises information relating to a period of time during which the first priority level of the first wireless AP node 102 is valid.

Further, the second wireless AP node 104 may be configured to transmit the negotiation response message to the first wireless AP node 102 via the radio communication link, the wired link or via the communication device, e.g. the wireless device 104b, 108', acting as the relay node.

The second wireless AP node 104 may further be configured to adjust, e.g. by means of an adjusting module 703, one or more CSMA/CA parameters, such as one or more of: IFS, CWmax, CWmin, TX power, and COAT. In some embodiments, the second wireless AP node 104 is configured to perform the adjustment when the first priority level of the first wireless AP node 102 has changed in relation to the second priority level of the second wireless AP node 104.

The second wireless AP node 104 may also comprise means for storing data such as user code data, e.g. information relating to neighbouring APs, wireless devices, priority levels, trigger events, period of times during which one or more priority levels are valid, etc. In some embodiments, the second wireless AP node 104 comprises a memory 704 configured to store the data. The user code data may be processed or non-processed user code data or data and/or information relating thereto. The memory 704 may comprise one or more memory units. Further, the memory 704 may be a computer data storage or a semiconductor memory such as a computer memory, a read-only memory, a volatile memory or a non-volatile memory. The memory 704 is arranged to be used to store obtained information, data, configurations, schedulings, and applications etc. to perform the methods herein when being executed in the second wireless AP node 104.

Embodiments herein for assisting in controlling radio resource usage may be implemented through one or more processors, such as the processor 705 in the arrangement depicted in FIG. 7, together with computer program code for performing the functions and/or method actions of embodiments herein. The program code mentioned above may also be provided as a computer program product, for instance in the form of a data carrier carrying computer program code for performing the embodiments herein when being loaded into the second wireless AP node 104. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the second wireless AP node 104.

Those skilled in the art will also appreciate that the transmitting module, receiving module, and adjusting module described above may refer to a combination of analog and digital circuits, and/or one or more processors configured with software and/or firmware, e.g. stored in the memory, that when executed by the one or more processors such as the processors in the second wireless AP node 104 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

A method performed by the management node 110 for controlling radio resource usage will now be described with reference to a flow chart depicted in FIG. 8. As mentioned above, the first wireless AP node 102 has the first RF coverage area 102a that is at least partly overlapping with the second RF coverage area 104a of the second wireless AP node 104 and the first and second wireless AP nodes 102,104 are operating on the same RF channel.

The method comprises one or more of the following actions. It should be understood that actions may be taken in another suitable order and that actions may be combined. According to some embodiments, the actions described below are performed in embodiments comprising a priority configuration that is controlled by the management node 110.

Action 801

The management node 110 receives, from the first and/or second wireless AP nodes 102,104 information relating to at least one trigger requirement.

As previously mentioned, the at least one trigger requirement may be one or more of: the number of wireless devices 108,104b associated with the first and/or second wireless AP node 102,104 exceed a threshold value; the number of active wireless devices 108,104b associated with the first and/or second wireless AP node 102,104 exceeds a threshold value; the percentage of airtime the first and/or second wireless AP node 102,104 accesses the RF channel exceeds a threshold value; the percentage of airtime the first and/or second wireless AP node 102,104 requires for serving one or more associated wireless devices 108,104b exceeds a threshold value; the number of overheard wireless devices 106b, 108" and/or overheard wireless AP nodes 106 from other BSSs exceeds a threshold value; and throughput statistics of one or more wireless devices 108,104b associated with the first and/or second wireless AP node 102,104 exceed a threshold value.

Action 802

The management node 110 determines the first priority level of the first wireless AP node 102 in relation to the second priority level of the second wireless AP node 104 based on the received information from the first and/or second wireless AP nodes 102,104. The first and second priority levels are priority levels for accessing the RF channel. In some embodiments, the management node 110 further determines a period of time during which period the first priority level is valid.

Action 803

The management node 110 transmits a priority configuration message to the first wireless AP node 102. The priority configuration message comprises information indicating the first priority level of the first wireless AP node 102. The priority configuration message may further comprise information relating to a period of time during which the first priority level of the first wireless AP node 102 is valid.

Thus, after processing the collected statistics from the first and/or second wireless AP nodes, the management node will send a priority configuration message to one or more of the wireless AP nodes. The message may be associated with a timer to define a valid period of time of the priority configuration. If the decided priority for a wireless AP node is the same as the current configuration, the management node may choose not to send the configuration message and thereby allow the wireless AP node to keep the current setting.

To perform the method for controlling radio resource usage, the management node 110 may comprise an arrangement depicted in FIG. 9. As previously mentioned, the first wireless AP node 102 is arranged to have the first RF coverage area 102a that is at least partly overlapping with the second RF coverage area 104a of the second wireless AP node 104. Further, the first and second wireless AP nodes 102,104 are arranged to operate on the same RF channel.

In some embodiments, the management node 110 comprises an input and/or output interface 900 configured to communicate with one or more wireless AP nodes, such as the first, second and third wireless AP nodes 102,104,106, one or more other network nodes, such as one or more other management nodes or one or more communications devices, such as the wireless devices 108,104b, 106b. The input and/or output interface 900 may comprise a wireless receiver and a wireless transmitter.

The management node 110 may further be configured to receive, e.g. by means of a receiving module 901, information relating to at least one trigger requirement from the first and/or second wireless AP nodes 102,104. The receiving module 901 may be the wireless receiver or a processor 905 of the management node 110. The processor will be described in more detail below.

As previously mentioned, the at least one trigger requirement may be one or more of: the number of wireless devices 108,104b associated with the first and/or second wireless AP node 102,104 exceed a threshold value; the number of active wireless devices 108,104b associated with the first and/or second wireless AP node 102,104 exceeds a threshold value; the percentage of airtime the first and/or second wireless AP node 102,104 accesses the RF channel exceeds a threshold value; the percentage of airtime the first and/or second wireless AP node 102,104 requires for serving one or more associated wireless devices 108,104b exceeds a threshold value; the number of overheard wireless devices 106b, 108" and/or overheard wireless AP nodes 106 from other BSSs exceeds a threshold value; and throughput statistics of one or more wireless devices 108,104b associated with the first and/or second wireless AP node 102,104 exceed a threshold value.

The management node 110 may further be configured to determine, e.g. by means of a determining module 902, the first priority level of the first wireless AP node 102. In some embodiments, the first priority level is determined in relation to the second priority level of the second wireless AP node 104 based on the received information from the first and/or second wireless AP nodes 102,104. The first and second priority levels are priority levels for accessing the RF channel. In some embodiments, the management node 110 is further configured to determine a period of time during which period the first priority level is valid. The determining module 902 may be the processor 905 of the management node 110.

The management node 110 may further be configured to transmit, e.g. by means of a transmitting module 903, a priority configuration message to the first wireless AP node 102. The priority configuration message comprises information indicating the first priority level of the first wireless AP node 102. Further, the priority configuration message may comprise information relating to a period of time during which the first priority level of the first wireless AP node 102 is valid. The transmitting module 903 may be the wireless transmitter or the processor 905 of the management node 110.

The management node 110 may also comprise means for storing data such as user code data, e.g. information relating to APs, wireless devices, priority levels, trigger events, period of times during which one or more priority levels are valid, etc. In some embodiments, the management node 110 comprises a memory 904 configured to store the data. The user code data may be processed or non-processed user code data or data and/or information relating thereto. The memory 904 may comprise one or more memory units. Further, the memory 904 may be a computer data storage or a semiconductor memory such as a computer memory, a read-only memory, a volatile memory or a non-volatile memory. The memory 904 is arranged to be used to store obtained information, data, configurations, schedulings, and applications etc. to perform the methods herein when being executed in the management node 110.

Embodiments herein for controlling radio resource usage may be implemented through one or more processors, such as the processor 905 in the arrangement depicted in FIG. 9, together with computer program code for performing the functions and/or method actions of embodiments herein. The program code mentioned above may also be provided as a computer program product, for instance in the form of a data carrier carrying computer program code for performing the embodiments herein when being loaded into the management node 110. One such carrier may be in the form of an electronic signal, optical signal, radio signal or computer readable storage medium. The computer readable storage medium may be a CD ROM disc or a memory stick.

The computer program code may furthermore be provided as pure program code on a server and downloaded to the management node 110.

Those skilled in the art will also appreciate that the receiving module, determining module and transmitting module described above may refer to a combination of analog and digital circuits, and/or one or more processors configured with software and/or firmware, e.g. stored in the memory, that when executed by the one or more processors such as the processors in the management node 110 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplifying Embodiments

Since the one or more wireless communications networks, e.g. WLAN systems, operate in an unlicensed spectrum, all devices operating in the networks should have a fair chance of accessing the RF channel and transmitting data thereon. Referring again to FIG. 2, the first wireless AP node 102, serves a large number of wireless devices 108, and thus should be able to receive a proportional channel usage time in order to serve all its associated wireless devices 108 in DL. Since both the second and third wireless AP nodes 104,106 have less associated wireless devices 104b, 106b, it would be fair to configure the first wireless AP node 102 to have higher priority in accessing the RF channel than the second and third wireless AP nodes 104,106. Since the population of both wireless communications networks is rather dynamic and the number of wireless devices as well as their traffic requirements change, the first wireless AP node 102 should not be granted the higher priority operation indefinitely, rather for some limited amount of time.

In some embodiments, a WLAN AP, e.g. the first wireless AP node 102, is configured to a "higher priority" in order to compensate for having to serve its large population of associated wireless devices. This priority gives the AP a statistically better chance to access the wireless medium, e.g. the RF channel, as compared to other fully or partially overlapping APs operating in the same frequency channel.

In some related embodiments, the WLAN AP negotiates its execution of the higher priority with other overlapping APs. In order to ease the presentation of this scenario, reference is made to FIG. 2. For simplicity, the case with only two overlapping networks comprising a total of three APs is illustrated. However, it should be understood that the problem may be extended in order to cover the general case of N overlapping APs.

In the illustrated scenario of FIG. 2, the first wireless AP node 102 is able to hear both the second and third wireless AP nodes 104,106 and vice versa. The first wireless AP node 102 is aware of the presence of the second and third wireless AP nodes 104,106, since it may successfully decode at least some of the transmissions to or from the second and third wireless AP nodes 104,106. Since the first wireless AP node 102 is the one that has the most associated wireless devices it may request from the second and third wireless AP nodes 104,106 permission in order to operate in "high priority" mode. The first wireless AP node 102 may also define the period of time for which it desired to operate in this mode and it may also provide the reason for the request. The second and third wireless AP nodes 104,106 may either grant or deny the request.

In some alternative embodiments, the request message does not comprise any more information than the request itself. The AP, e.g. the second or third wireless AP node 104,106, that receives the request understands the set of requirements have been fulfilled in the AP, e.g. the first wireless AP node 102, that sends the request. With this approach, the amount of information exchange between the APs is minimized.

The AP, e.g. the second or third wireless AP node 104,106, that receives the request message may respond the sender, e.g. the first wireless AP node 102, with a response that comprises the acceptance or rejection of the request. In one embodiment, the response is or comprises one bit that indicates acceptance or rejection. In an alternative embodiment, the response may comprise more information. One example of such information is the valid period of time of the priority setting.

In some other related embodiments, the higher priority is only granted temporarily and last for a certain duration. The AP, e.g. the first wireless AP node 102, may re-evaluate the requirements and negotiate with other APs, e.g. the second or third wireless AP node 104,106, before the expiration of the duration in order to prolong the usage of the "high priority" mode. Furthermore, an AP, e.g. the first wireless AP node 102, may decide to terminate the priority configuration before the duration has expired. This may be the case of one or more conditions have changed. If the AP, e.g. the first wireless AP node 102, terminates the priority configuration before it has expired, it may or may not notify other overlapping APs, e.g. the second or third wireless AP node 104,106, about the termination.

In some other related embodiments, the "higher priority" implies that the AP, e.g. the first wireless AP node 102, may adjust one or all of the CSMA/CA parameters, e.g. IFS, CWmax, CWmin, TX power, COAT. As an example, if the AP, e.g. the first wireless AP node 102, is configured to a higher priority, it may use shorter IFS in order to have a statistically better chance of accessing the wireless medium, e.g. the RF channel. However, the AP, e.g. the first wireless AP node 102, may also limit its transmission in order to not starve other devices operating on the same RF channel. In one embodiment, a higher priority may be configured to the AP, e.g. the first wireless AP node 102, that requests the higher priority. As an alternative, the overlapping APs, e.g. the second or third wireless AP node 104,106, that receive the request may be configured to a lower priority.

Some of the proposed parameters, e.g. CWmax and CWmin, that control the priority are also used for QoS differentiation. In such case, the requested priority configuration may be applied to certain types of services only. For example, the real-time services may not be affected by the proposed priority configuration and always have the highest priority, and therefore the priority differentiation between APs may be applied only to other types of services.

When using the word "comprise" or "comprising" it shall be interpreted as non-limiting, i.e. meaning "consist at least of". Further, when using the word "a", or "an" herein it should be interpreted as "at least one", "one or more", etc.

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method performed by a first wireless Access Point, AP, node for controlling radio resource usage, wherein the first wireless AP node has a first Radio Frequency, RF, coverage area that is at least partly overlapping with a second RF coverage area of a second wireless AP node, wherein the first and second wireless AP nodes are operating on the same RF channel and wherein the method comprises:
  transmitting, to the second wireless AP node, a negotiation request message, wherein the negotiation request message comprises information indicating a request for the first priority level;
  receiving, from the second wireless AP node, a negotiation response message, wherein the negotiation response message comprises information relating to the request for the first priority level of the first wireless AP node;
  configuring, based on the negotiation response message, a first priority level of the first wireless AP node in relation to a second priority level of the second wireless AP node, which first and second priority levels are priority levels for accessing the RF channel; and
  transmitting, to a wireless device associated with the first wireless AP node, data via the RF channel in dependence of the first priority level, whereby the radio resource usage is controlled.

2. The method of claim 1, further comprises:
  when the first priority level of the first wireless AP node has changed in relation to the second priority level of the second wireless AP node, the configuring further comprises:
  adjusting one or more Carrier Sensing Multiple Access with Collision Avoidance, CSMA/CA, parameters, such as one or more of: Inter-Frame Spacing, IFS; Contention Window Maximum size, CWmax; Contention Window Minimum size, CWmin; Transmitting, TX, power; and Clear Channel Assessment Threshold, CCAT.

3. The method of claim 1, wherein configuring the first priority level of the first wireless AP node further comprises:
  configuring the first priority level for at least one type of service.

4. The method of claim 1, wherein transmitting the negotiation request message further comprises:
  transmitting the negotiation request message when at least one trigger requirement is fulfilled, and
  wherein the at least one trigger requirement is one or more of: the number of wireless devices associated with the first wireless AP node exceeds a threshold value;
  the number of active wireless devices associated with the first wireless AP node exceeds a threshold value;
  the percentage of airtime the first wireless AP node accesses the RP channel exceeds a threshold value;
  the percentage of airtime the first wireless AP node requires for serving the associated wireless devices exceeds a threshold value;
  the number of overheard wireless devices and/or overheard wireless AP nodes from other Basic Service Sets, BSS, exceeds a threshold value; and
  throughput statistics of one or more wireless devices associated with the first wireless AP node exceed a threshold value.

5. The method of claim 1, wherein the request for the first priority level is a request for permission to operate in a different priority mode, wherein the first priority level of the first wireless AP node is different from the second priority level of the second wireless AP node.

6. The method of claim 1, wherein transmitting the negotiation request message, further comprises:
  transmitting the negotiation request message to the second wireless AP node via a radio communication link, a wired link or via a wireless device acting as a relay node; and
  wherein receiving the negotiation response message, further comprises:
  receiving the negotiation response message from the second wireless AP node via the radio communication link, the wired link or via the wireless device acting as the relay node.

7. The method of claim 1, further comprising:
  receiving, from a management node, a priority configuration message, which priority configuration message comprises information indicating the first priority level of the first wireless AP node, and wherein configuring further comprises:
  configuring the first priority level based on the received priority configuration message.

8. A first wireless Access Point, AP, node for controlling radio resource usage, wherein the first wireless AP node is arranged to have a first Radio Frequency, RF, coverage area that is at least partly overlapping with a second RF coverage area of a second wireless AP node, wherein the first and second wireless AP nodes are arranged to operate on the same RF channel and wherein the first wireless AP is configured to:
- transmit, to the second wireless AP node a negotiation request message, wherein the negotiation request message comprises information indicating a request for the first priority level;
- receive, from the second wireless AP node, a negotiation response message wherein the negotiation response message comprises information relating to the request for the first priority level of the first wireless AP node;
- configure, based on the negotiation response message, a first priority level of the first wireless AP node in relation to a second priority level of the second wireless AP node, which first and second priority levels are priority levels for accessing the RF channel; and
- transmit, to a wireless device associated with the first wireless AP node, data via the RF channel in dependence of the first priority level, whereby the radio resource usage is controlled.

9. The first wireless AP node of claim 8, further configured to:
- when the first priority level of the first wireless AP node has changed in relation to the second priority level of the second wireless AP node, adjust one or more Carrier Sensing Multiple Access with Collision Avoidance, CSMA/CA, parameters, such as one or more of: Inter-Frame Spacing, IFS;
- Contention Window Maximum size, CWmax;
- Contention Window Minimum size, CWmin;
- Transmitting, TX, power; and
- Clear Channel Assessment Threshold, CCAT.

10. The first wireless AP node of claim 8, further configured to:
- configure the first priority level for at least one type of service.

11. The first wireless AP node of claim 8, further configured to:
- transmit the negotiation request message when at least one trigger requirement is fulfilled, and
- wherein the at least one trigger requirement is one or more of: the number of wireless devices associated with the first wireless AP node exceeds a threshold value;
- the number of active wireless devices associated with the first wireless AP node exceeds a threshold value;
- the percentage of airtime the first wireless AP node accesses the RF channel exceeds a threshold value;
- the percentage of airtime the first wireless AP node requires for serving the associated wireless devices exceeds a threshold value;
- the number of overheard wireless devices and/or overheard wireless AP nodes from other Basic Service Sets, BSS, exceeds a threshold value; and
- throughput statistics of one or more wireless devices associated with the first wireless AP node exceed a threshold value.

12. The first wireless AP node of claim 8, wherein the request for the first priority level is a request for permission to operate in a different priority mode, wherein the first priority level of the first wireless AP node is different from the second priority level of the second wireless AP node.

13. The first wireless AP node of claim 8, further configured to:
- transmit the negotiation request message to the second wireless AP node via a radio communication link, a wired link or via a wireless device acting as a relay node; and
- receive the negotiation response message from the second wireless AP node via the radio communication link, the wired link or via the wireless device acting as the relay node.

14. The first wireless AP node of claim 8, further configured to:
- receive, from a management node, a priority configuration message, which priority configuration message comprises information indicating the first priority level of the first wireless AP node, and
- configure the first priority level based on the received priority configuration message.

* * * * *